Figures 1, 2:
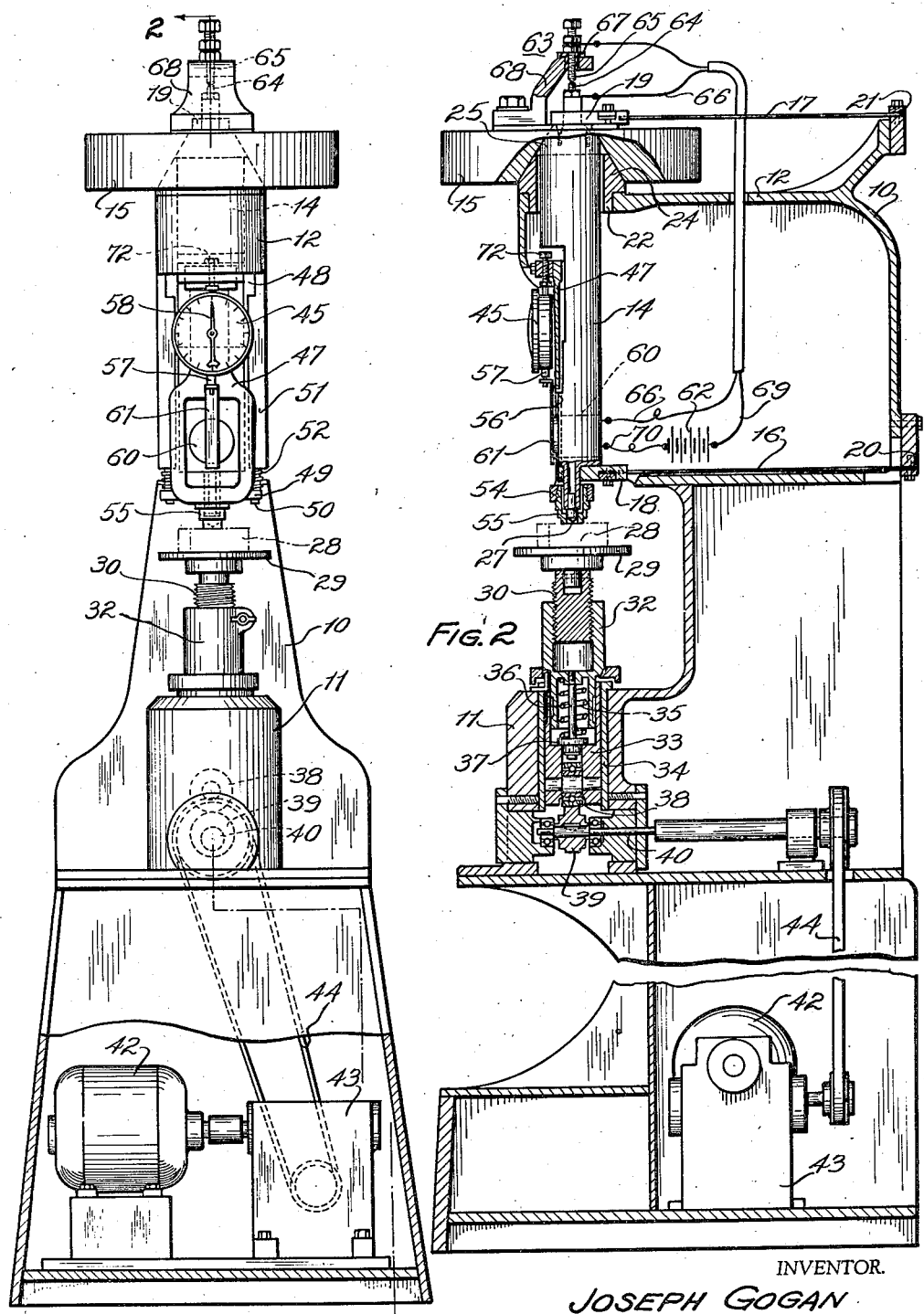

June 28, 1938.  J. GOGAN  2,122,203

CONTINUOUS HARDNESS TESTER

Filed April 18, 1936

INVENTOR.
JOSEPH GOGAN
BY Kwis, Hudson & Kent
ATTORNEYS.

Patented June 28, 1938

2,122,203

UNITED STATES PATENT OFFICE 2,122,203

CONTINUOUS HARDNESS TESTER

Joseph Gogan, Lakewood, Ohio

Application April 18, 1936, Serial No. 75,140

4 Claims. (Cl. 265—12)

This invention relates to the testing of materials, and more particularly to improved apparatus for rapidly and accurately testing or determining a characteristic, for example the hardness, of individual bodies.

An object of the invention is to provide improved testing apparatus having cooperating penetrator and anvil members and means operating continuously during a given test period for causing said members to perform tests on individual specimens inserted therebetween in succession.

Another object of this invention is to provide an improved testing machine having a penetrator and a continuously movable anvil for successively pressing individual specimens against the penetrator.

Still another object of this invention is to provide an improved testing machine, of the type mentioned, having a gauge and novel electric means enabling the gauge to measure the distortion of each specimen.

A further object of the invention is to provide an improved machine, of the type mentioned, having a spindle and a gravity weight adapted to be lifted in succession by the action of the movable anvil, and wherein electric means controlling the operation of a gauge includes cooperating contacts carried respectively by the spindle and weight.

The testing apparatus of the present application is an improvement over the apparatus disclosed in copending application Serial No. 667, filed January 7, 1935 now Patent No. 2,053,472, issued September 8th, 1936.

Other objects and advantages of the invention will be apparent from the following description, when taken in conjunction with the accompanying sheet of drawings, wherein Fig. 1 is a front elevation showing a testing machine embodying my invention, and Fig. 2 is a vertical sectional view thereof taken on the line 2—2 of Fig. 1.

More detailed reference will presently be made to the accompanying drawing which illustrates one embodiment of the improved testing arrangement of my invention. Before proceeding with such more detailed description, however, it should be understood that the drawing is illustrative only, and that the invention may be embodied in various other testing machines and arrangements.

The machine illustrated in this instance is a hardness testing machine of the type adapted to make comparative hardness tests on individual bodies, and in disclosing my invention reference will be made to this hardness testing machine in more or less detail, but it should be understood that the invention is not necessarily limited in its useful application to this particular service or machine. The hardness testing machine shown in this instance is provided with a frame 10 having an anvil mount or work supporting portion 11, and a head 12 which is in vertically spaced relation above this mount and overhangs the same.

The head 12 of the frame forms a mount for a vertically movable test spindle 14, and a rest for a vertically movable weight 15 which provides a test load of predetermined value. The spindle 14 is vertically movable in the head 12 substantially in alignment with the axis of the anvil mount 11, the spindle being connected with the frame for such vertical movement preferably by a pair of vertically spaced, laterally extending, substantially parallel flexible metal hinge strips or links 16 and 17. These hinge strips are connected to the spindle adjacent opposite ends thereof, as indicated at 18 and 19, and at their opposite ends are connected, respectively, to the frame at points 20 and 21. The upper end of the spindle may extend loosely through a bushing 22 which is mounted on the frame. This bushing is provided with a cone-like portion 24 forming a support or seat for the weight 15 and the upper end of the spindle is provided with a similar cone-like portion 25 for lifting engagement with the weight.

The lower end of the spindle carries a penetrator 27 for engagement with a specimen 28. The penetrator may be of any suitable type, depending upon the characteristics of the machine and of the specimens to be tested and may, for example, be a penetrator having a Brinell ball, a diamond, or equivalent member, at the point thereof.

The spindle 14 is preferably constructed to contain a substantial body of metal so that the weight of the spindle itself may be utilized as a minor or preliminary test load for pressing the penetrator 27 against the specimen. The weight 15 is normally supported upon the frame of the machine through the bushing 22 but, as will presently be explained, may be utilized to provide a major test load to be also applied to the specimen through the spindle.

An important feature of my invention is the provision of an anvil 29 which is reciprocated continuously during a given test period or test run for successively pressing individual specimens against the penetrator. The anvil may be carried by an adjusting screw 30 which projects from a nut member formed by two telescoping parts 32 and 33. The screw may extend into a threaded opening of the part 32 so that the anvil position may be adjusted by rotating the screw relative to this nut part.

The part 33 may be in the form of a plunger which is slidable in a bushing or sleeve 34 mounted in an opening of the frame portion 11. The telescoping parts 32 and 33 are movable axially relative to each other but such movement is resisted by a compression spring 35 disposed therebetween. This spring is designed to yield while the major load is being applied so that the penetrator will be moved into the specimen at a slow rate, which is desirable for the sake of accuracy. If desired the spring may be disposed in surrounding relation to a rod 36 and between the part 32 and a washer 37 which is slidable on the rod.

For causing reciprocation of the anvil, I provide the part 33 with a roller 38 with which a rotary cam 39 cooperates. The cam may be carried by a shaft 40 which is suitably mounted on the frame of the machine. The shaft 40 may be driven from any suitable source of power, such as the electric motor 42, which is connected with the shaft by the reduction gear 43 and the belt 44.

I provide this machine with means for measuring the distortion or penetration of each specimen by the penetrator 27. This measuring means may include a depth gauge 45 which is actuated in response to relative movement between the spindle and the anvil.

One arrangement which I have found to be satisfactory for the distortion measuring means includes a gauge support 47 which is mounted on the frame of the machine for vertical movement. This support may be a vertically elongated member disposed just in front of the spindle and guided on the frame during the vertical movement. The upper end of the gauge support may be operable in a guideway provided on the frame between spaced guide members 48, and the lower end of the support may have lateral projections 49 provided with openings to receive guide rods 50 depending from the frame portions 51. A pair of relatively light compression springs 52 may be interposed between the frame portions 51 and the projections 49 for normally urging the gauge support 47 toward the bottom of its downward movement. The gauge support may be provided adjacent the lower end thereof with means for engagement with the specimens being tested and this means may consist in a threaded projection 54 in which a cup-like "feeler" 55 is mounted. The feeler preferably surrounds the penetrator 27 and is of such length that its lower end engages the specimen substantially simultaneously with the point of the penetrator. The extent of downward movement of the spindle 14 may be limited by engagement of the connection 19 with the top of the weight 15, and downward movement of the gauge support 47 may be limited by suitable means such as a shoulder 56 on the spindle.

The depth gauge 45 is mounted on the vertically movable support 47. The gauge 45 may be of the type having a reciprocable operating stem 57 projecting therefrom and a pointer 58 which is arcuately movable over a graduated dial in response to movements of the stem. A spring contained in the mechanism of the gauge normally acts to return the pointer to its zero or initial position.

For operating the gauge 45 I utilize the distorting movement of the penetrator 27 into the specimen 28 which, from the arrangement illustrated and thus far described, will be seen to be relative movement between the spindle 14 and the gauge support 47. A suitable releasable operating connection between the spindle and the gauge stem 57 may be provided by an electromagnet 60 and an armature 61. The electromagnet is preferably mounted in an opening of the spindle 14. The armature 61 may be a magnetizable strip loosely connected to the gauge stem 57 and extending downwardly across the outer end of the electromagnet.

The energizing circuit for the electromagnet may include a storage battery 62, or any other suitable current source, and a switch 63 having cooperating contacts 64 and 65. The contact 64 may be carried on the upper end of the spindle and may be connected with one terminal of the electromagnet 60 by the conductor 66. The contact 65 may be held by an insulating sleeve 67 of a supporting bracket 68 which is mounted on the weight 15. Contact 65 is connected with one terminal of the battery 62 by a conductor 69 and the other terminal of the battery may be connected with the other terminal of the electromagnet 60 by the conductor 70.

In the operation of my improved testing apparatus the anvil 29 is reciprocated continuously and at a desired rate, for example, 45 strokes per minute by the action of the rotary cam 39. The operator inserts individual specimens in succession between the anvil 29 and the penetrator 27, one such specimen being inserted just prior to each upward movement of the anvil. When a specimen is thus inserted it is lifted by the anvil into engagement with the feeler 55 and the penetrator. The specimen thus lifts the gauge support 47 and the spindle 14 at which time the weight of the spindle acting as a minor test load, causes the point of the penetrator to move through the scale or dirt adhering to the surface of the specimen.

Upward movement of the spindle causes the contacts 64 and 65 of the switch 63 to be closed to thereby energize the electromagnet 60. The energizing of this magnet causes the armature 61 to be attracted and held thereagainst, thereby connecting the gauge stem 57 with the spindle. Simultaneously with or immediately following the closing of the switch 63 the spindle engages and picks up the weight 15 so that the load represented by this weight is applied to the specimen through the spindle and the penetrator. Movement of the penetrator into the specimen under the influence of this load causes relative movement between the spindle and the gauge support 47 thereby causing movement of the gauge stem 57. This movement, which may be on the order of some thousandths or millionths of an inch, is transmitted through the gear train of the gauge and thereby multiplied to cause a substantial rotary or arcuate movement of the pointer 58.

When the anvil 29 moves downwardly and thereby lowers the specimen 28, together with the spindle and gauge support, the load of the weight 15 is transferred from the spindle back to the bushing 22 of the frame. The contacts of the switch 63 are then separated by downward movement of the spindle and the electromagnet 60 is deenergized. The deenergization of this magnet releases the gauge actuating member 61 and the spring contained in the gauge mechanism returns the pointer 58 to its zero or initial position.

It will be understood that the gauge may be initially set or adjusted either by rotation of the dial, or by adjusting the stop screw 72 which is engaged by a projecting portion of the gauge spindle 57. Each time that the penetrator is pressed into a specimen the operator notes the gauge reading at which the pointer comes to rest. By comparing this reading with a reading obtained by performing a similar test on a specimen of known hardness, the operator will know whether the specimen is acceptable, or whether it is to be rejected as too hard or too soft.

From the foregoing description and the accompanying drawing it will now be understood that I have provided improved testing apparatus which is extremely accurate and which can be operated by a relatively unskilled laborer. It will also be seen that the provision of the continuously moving anvil enables the operator to increase the rate at which accurate tests can be made and enables him to make the tests at a definite production rate.

While I have illustrated and described my improved testing apparatus in a somewhat detailed manner, it should be understood, however, that I do not wish to be limited to the precise details of construction and arrangements of parts herein disclosed, but regard my invention as including such changes and modifications as do not involve a departure from the spirit of the invention and the scope of the appended claims.

Having thus described my invention, I claim:

1. In a testing machine, a frame, a movable spindle having a penetrator, an anvil movable toward and from said spindle for pressing a specimen against said penetrator, means resisting movement of the spindle for supplying a test load, a gauge having an actuating member, electrically operated means for releasably connecting the gauge actuating member for movement substantially proportionately with movement of the penetrator, and a switch controlling said electrically operated means and adapted to be actuated by movement of the spindle.

2. In a testing machine, a frame, a movable spindle having a penetrator, an anvil movable toward and from said spindle for pressing a specimen against said penetrator, a weight normally supported by the frame and adapted to be lifted by the spindle for supplying a test load, a gauge having an actuating member, electrically operated means for releasably connecting the gauge actuating member for movement substantially proportionately with movement of the penetrator, and a switch controlling said electrically operated means and comprising cooperating contacts carried by said spindle and said weight.

3. In a testing machine, a frame, a movable spindle having a penetrator, a movable gauge support, a movable anvil, means for reciprocating said anvil continuously during a given test period for successively bringing individual specimens into lifting engagement with the penetrator and said gauge support, a weight normally supported on the frame and adapted to be lifted by the spindle to provide a test load, an electromagnet carried by said spindle, a gauge on said support having an actuating member extending adjacent the electromagnet, a circuit for the magnet, and cooperating contacts controlling said circuit and carried respectively by said spindle and said weight.

4. In a testing machine, a frame, a movable spindle having a penetrator, a movable gauge support, a movable anvil, means for reciprocating said anvil continuously during a given test period for successively bringing individual specimens into lifting engagement with the penetrator and said gauge support, said spindle being weighted to provide a minor test load, a weight normally supported on the frame and adapted to be lifted by the spindle to provide a major test load, an electromagnet carried by said spindle, a gauge on said support having an actuating member extending adjacent the electromagnet, a circuit for the magnet, and cooperating contacts controlling said circuit and carried respectively by said spindle and said weight.

JOSEPH GOGAN.